(12) United States Patent
Bandholz et al.

(10) Patent No.: US 7,474,117 B1
(45) Date of Patent: *Jan. 6, 2009

(54) BI-DIRECTIONAL UNIVERSAL SERIAL BUS BOOSTER CIRCUIT

(75) Inventors: Justin P. Bandholz, Cary, NC (US);
Moises Cases, Austin, TX (US);
Bradley D. Herman, Cary, NC (US);
Erdem Matoglu, Austin, TX (US);
Bhyrav M. Mutnury, Austin, TX (US);
Thomas D. Pahel, Chapel Hill, NC (US); Pravin S. Patel, Cary, NC (US);
Nam H. Pham, Round Rock, TX (US);
Christopher C. West, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/127,165

(22) Filed: May 27, 2008

Related U.S. Application Data

(63) Continuation of application No. 12/023,659, filed on Jan. 31, 2008, now Pat. No. 7,394,281.

(51) Int. Cl.
*H03K 17/16* (2006.01)

(52) U.S. Cl. .......................... 326/22; 326/92

(58) Field of Classification Search ................. 326/21, 326/26, 27, 82–86, 92–96
See application file for complete search history.

(56) References Cited

U.S. PATENT DOCUMENTS

| 6,414,523 | B1 | 7/2002 | Yoshizaki |
| 6,593,867 | B2 * | 7/2003 | Nguyen ................... 341/144 |
| 6,724,224 | B1 * | 4/2004 | Li ............................ 326/82 |
| 6,842,058 | B2 | 1/2005 | McNitt et al. |
| 2001/0052040 | A1 | 12/2001 | Takazawa et al. |

OTHER PUBLICATIONS

"Robust Design Techniques for USB Switches in Ultra-Portable and Consumer Applications", G. Connolly, ESE Magazine, http://www.esemagazine.com/index.php?option=com_content&task=view&id=166&Itemid=2, accessed Jan. 27, 2008.

* cited by examiner

*Primary Examiner*—Don P Le
(74) *Attorney, Agent, or Firm*—Cantor Colburn LLP; Cynthia Byrd

(57) ABSTRACT

A method of transmitting a signal on a bi-directional universal serial bus ("USB") circuit for boosting a signal on a USB bus disclosed. The circuit includes a first stage inverting buffer coupled to a second stage inverting buffer to form a non-inverting buffer circuit. A high pass filter is coupled in series with the non-inverting buffer circuit to provide AC coupling to the USB bus and to allow fast signal edges through the circuit. The booster circuit is arranged to improve signal quality over a USB bus to allow additional USB devices and longer USB busses to be utilized.

1 Claim, 4 Drawing Sheets

US 7,474,117 B1

BI-DIRECTIONAL UNIVERSAL SERIAL BUS BOOSTER CIRCUIT

CROSS REFERENCE TO RELATED APPLICATIONS

The present application is a continuation of U.S. patent application Ser. No. 12/023,659 entitled Bi-directional Universal Serial Bus Booster Circuit filed on Jan. 31, 2008 which is incorporated herein by reference in its entirety.

TRADEMARKS

IBM ® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates generally to a booster circuit for a universal serial bus ("USB") and in particular to a circuit having a two stage buffer circuit coupled to the USB bus through a high pass resistor-capacitor filter.

Peripherals and external devices are commonly connected to a computer system using some type of bus arrangement. Traditionally, the connection was made using either a serial connection using a protocol such as RS-485 or via a parallel port using a protocol such as IEEE 1284. As the number of devices that needed to be connected increased, a new serial bus standard, known as universal serial bus ("USB"), was developed to aid in the interconnectability of computers and external devices. One aspect of the USB standard is that multiple devices could be connected to a single port on the computer using a device known as hub.

The USB standard provided a number of advantages over the previously used protocols. USB was designed to allow multiple external devices to be connected using a single standardized hardware interface. The standard also provided for power to be transferred to the devices allowing a number of devices to eliminate secondary power sources. Further, the devices could be connected and disconnected by the computer without rebooting or restarting the host computer. As a result of these features, the USB standard was widely adopted and the number of devices that coupled via USB grew rapidly.

To accommodate the increasing number of devices that connected via USB, peripherals known as USB "hubs" were developed that allowed multiple devices to be connected to a single USB port. Also, the USB standard increased the bit-rate that data could be transferred over the bus allowing devices such as external hard drives to become more practical. However, as the number of connected devices increases, the length of the bus also increases which in turn adversely impacts signal quality. Further, as the allowable bit-rate increased, the required level of signal integrity also increased.

Signal integrity is analyzed using an eye diagram that measures rise time, fall time, undershoot, overshoot and jitter. If a signal on the bus falls outside of the eye diagram specified by the USB standard, the signal will fail. A device that is normally USB compliant, meaning it transmits signals that comply with the standard, may start to fail if too many devices are coupled to the same bus, or if the physical length of the bus becomes too long. Thus, the number of devices and the speed of data transfer are limited by the quality of the signal.

While current USB bus topologies are sufficient for their intended purposes, it is desired to have computer systems incorporating longer USB bus lengths with more devices attached. In particular, it is desirable to have a system that is capable of boosting USB signs that have a slow edge rate to prevent rejection or signal delay.

SUMMARY OF THE INVENTION

A method of transmitting signal on a bi-directional universal serial bus booster circuit is provided. An input terminal is connected to a universal serial bus. Then a first inverting buffer is coupled in series with the input terminal. A second inverting buffer is then directly coupled in series with the first inverting buffer to form a non-inverting buffer with the first inverting buffer and the second inverting buffer. A resistor-capacitor ("RC") passive filter is coupled in series with the second buffer. An output terminal is coupled to the RC passive filter wherein the output terminal is configured to connect with the universal serial bus. A first resistor is directly coupled in series with the input terminal and the first inverting buffer. A second resistor directly coupled in series with the second inverting buffer circuit and the RC pass filter. The first resistor, the second resistor and the RC passive filter are arranged to create positive feedback with respect to the input terminal. Further, the RC passive filter limits modification of signals on the universal serial bus to signals with high-speed edge rates without affecting slow speed signaling, full speed signaling and special bus events on the universal serial bus.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
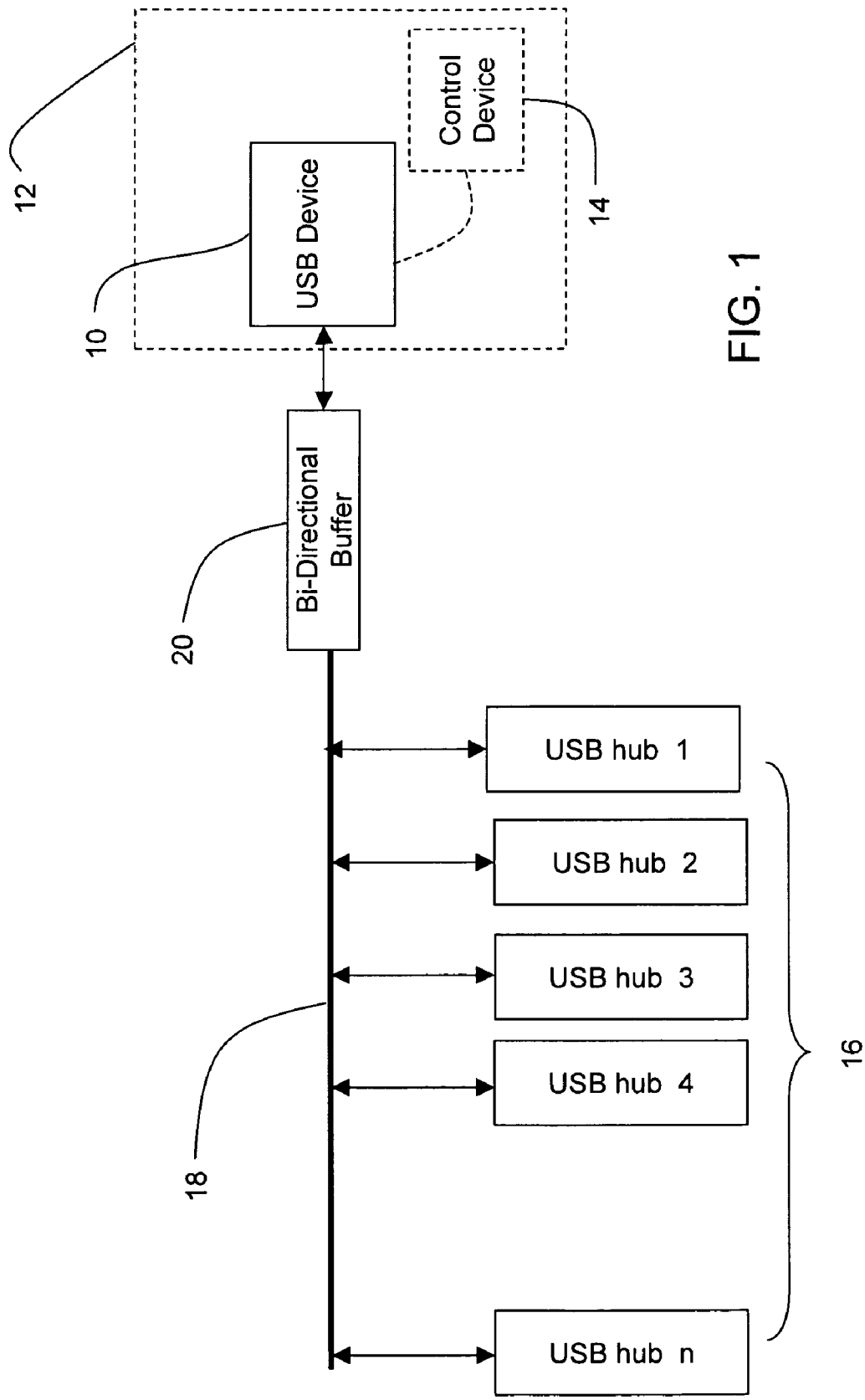
FIG. 1 illustrates a schematic representation of a universal serial bus circuit having a bidirectional booster circuit.

A system incorporating a universal serial bus ("USB") compliant bus is illustrated in FIG. 1. The USB root hub 10 may be root hub coupled to a computer 12 such as a Blade-Center ® manufactured by International Business Machines Corporation. A root hub 10 is typically built into a host controller 14 that couples and translates the signals received over the USB bus with other circuitry in the computer 12. Alternatively, the USB device 10 may be a USB hub that couples downstream USB Hubs 16 to an upstream bus (not shown). The USB device 10 is coupled to the USB bus 18 by a bi-directional booster circuit 20. It should be appreciated that the USB standard allows for multiple tiers of USB devices, commonly called branches, to be coupled together and that the bidirectional booster circuit 20 described herein may be used with any or all of the tiers.

Figure 2:
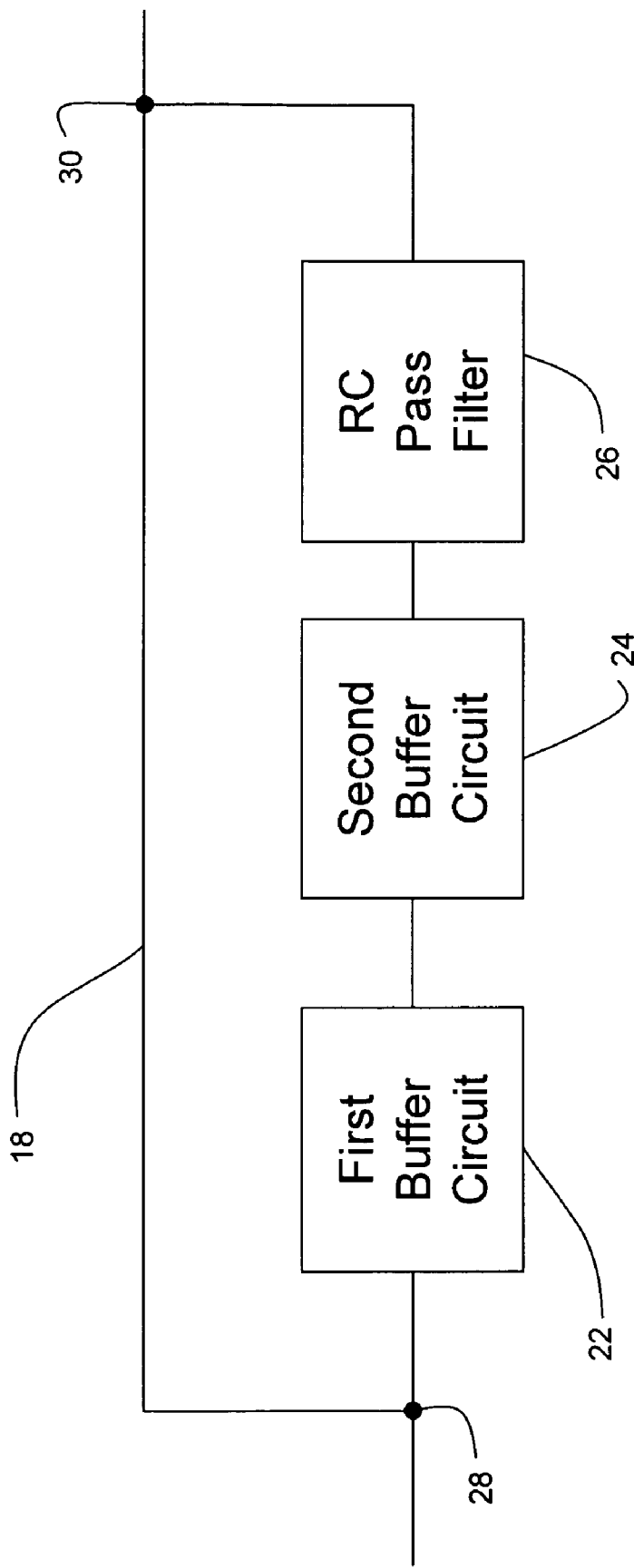
FIG. 2 illustrates a schematic representation of the bidirectional booster circuit of FIG. 1.

As it will be described in more detail herein, the bidirectional booster circuit 20 does not electrically isolate the components connected by the bus 18 and therefore keeps the signal delay to a minimum. An exemplary embodiment of the booster circuit 20 is illustrated in FIG. 2. In this embodiment, the booster circuit 20 is coupled in parallel to the USB bus 18. A first buffer circuit 22 is coupled to receive signals from the USB bus 18. A second buffer circuit 24 is electrically coupled in series to the first buffer circuit 22. In the exemplary embodiment, each of the buffer circuits 22, 24 is an inverting type of buffer. The circuits 22, 24 are then arranged in a cascading manner to cooperate and form a non-inverting buffer. Finally, a resistor-capacitor ("RC") passive filter 26 is coupled in series to the first and second circuits 22, 24 and couples to the output terminal 30 thus completing the connection of the bi-directional booster circuit 20 back to the USB bus 18.

Figure 4:
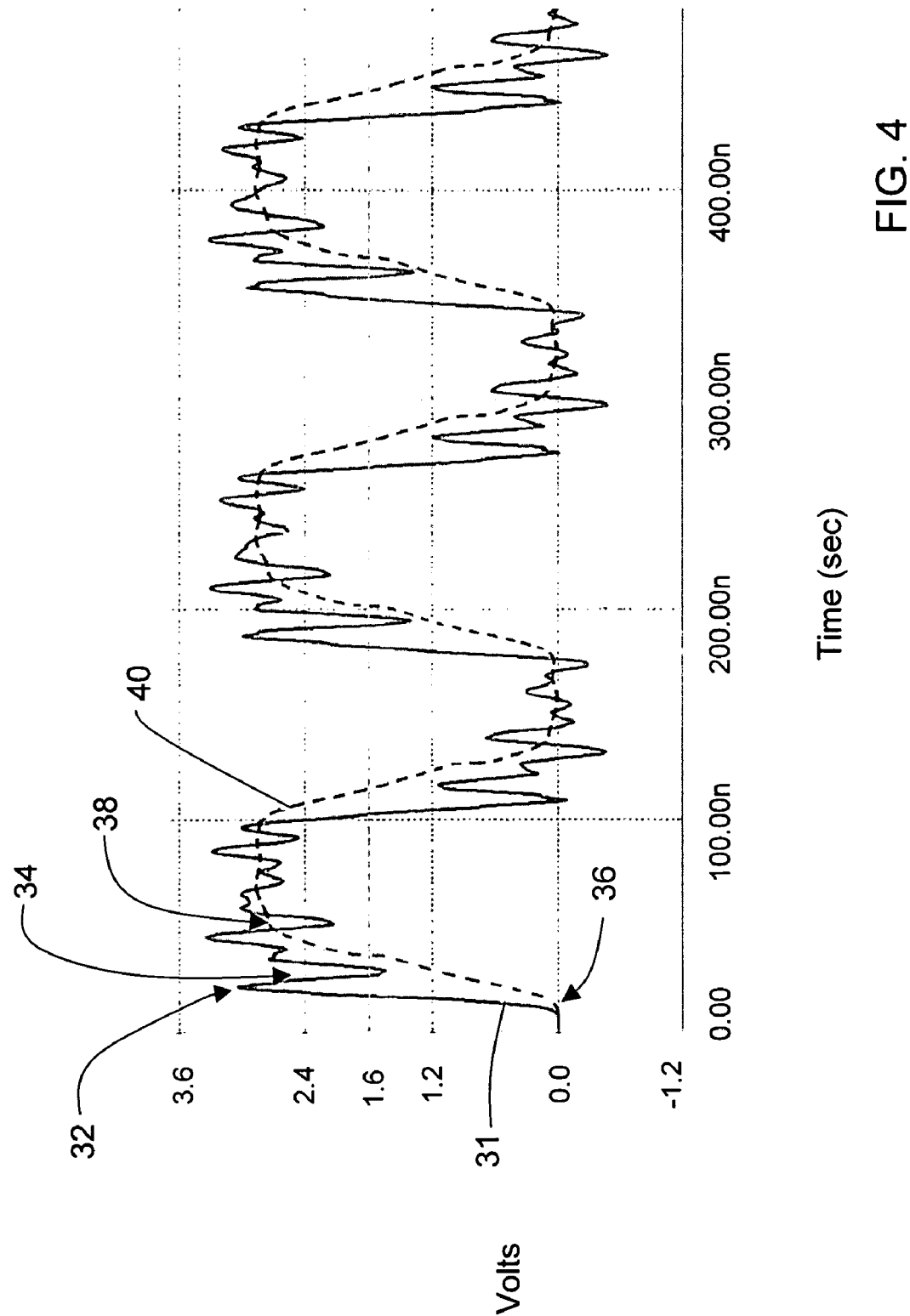

As best seen in FIG. 4, during operation, a signal 31 is transmitted over the USB bus 18 and received at the booster circuit input terminal 28. The signal 31 may contain number of peaks 32 and valleys 34. These peaks and valleys, commonly referred to as ringback, increase as the number USB Hubs 16 increases and the length of the USB bus 18 increases. The presence of ringback is indicative of signal degradation and may eventually lead to the signal being rejected by the USB devices. When the bidirectional booster circuit 20 detects a slow rising edge 36 on a signal being transmitted over the bus 18, the first buffer circuit 22 drives the second buffer circuit 24 with the RC pass filter 26 reinforcing the direction of the signal change. Once the signal reaches a steady state 38, the RC pass filter 26 de-couples the buffer circuits 22, 24 from the USB bus 18. The resulting signal 40 at the output terminal 30 on the USB bus 18 has improved signal quality by smoothing out the peaks and valleys and a shorter time delay. By improving signal on the USB bus 18, more devices 16 can be accommodated on a given bus.

The RC pass filter 26 also acts as a high pass filter that performs two functions. First, the RC pass filter 26 alternating current ("AC") couples the bi-directional booster circuit 20 to the USB bus 18. This prevents the direct-current ("DC") level at the output terminal 30 from affecting the steady state voltage on the USB bus 18. Second, the RC pass filter 26 only allows signal edges that are very fast through, this limits the signal modification to high-speed edge rates without affecting slow speed signaling, full speed signaling and special bus events.

For purposes of clarity, only one bi-directional buffer has been described herein as being coupled to the USB bus 18, but the embodiments are not so limited. Communication between the external devices 16 and the USB device 10 is based on pipes (logical channels). Pipes are connections from the host controller to a logical entity on the device named an endpoint. A USB device 10 may have up to 32 active pipes, 16 into the host controller and 16 out of the controller. Each endpoint can transfer data in one direction only, either into or out of the device, so each pipe is uni-directional. In one embodiment, there is a bi-directional buffer circuit for each pipe.

Figure 3:
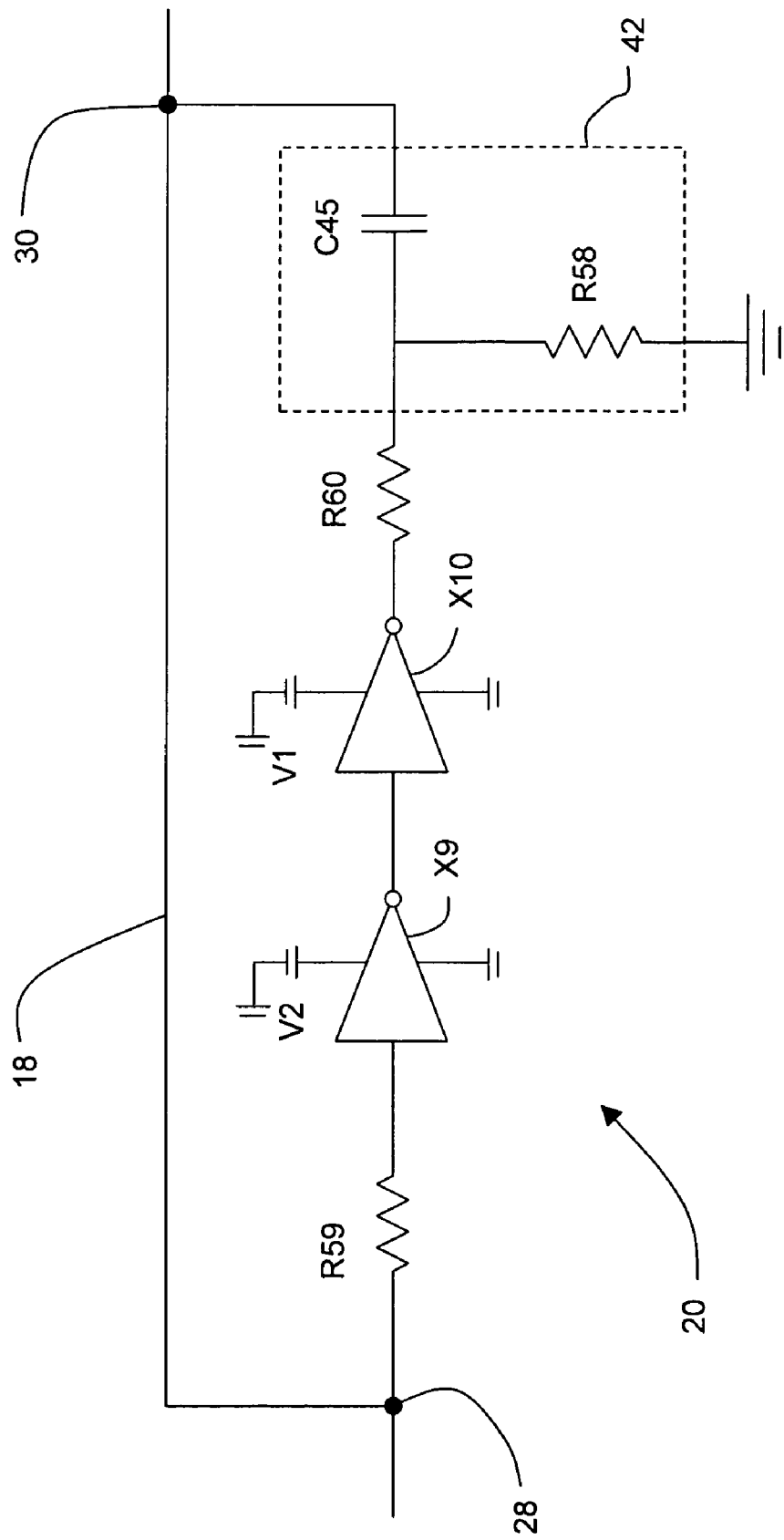
FIG. 3 illustrates an exemplary embodiment of the bidirectional booster circuit of FIG. 2.; and, FIG. 4 illustrates signal waveforms at the input and output terminals of the bi-directional booster circuit of FIG. 3.

Another embodiment of the bi-directional booster circuit 20 is illustrated in FIG. 3. In this embodiment, the bi-directional booster circuit 20 is coupled to the USB bus 18 by an input terminal 28 and an output terminal 30. A first inverting buffer stage X9 is cascaded with second inverting buffer stage X10 to form a non-inverting buffer. The first and second inverting buffer stage X9, X10 are connected in series with resistor R60, C45 and R59 to create a positive feedback arrangement with respect to the input terminal 28.

A resistor R58 is connected to ground between the resistor R60 and the capacitor C45. The resistor R58 and capacitor C45 form a RC high pass filter 42. As discussed above, the high pass filter AC couples the output of buffer circuits X9, X10 to the USB bus 18. This keeps the DC level of the buffer circuits X9, X10 output from affecting the steady stage voltage on the USB bus 18.

In an embodiment, the resistors R59 and R60 have a value of 100 Ω, while the resistor R58 has a value of 1000 Ω. Further, the capacitor C45 has a value of 120 pico-Farads. When this embodiment is coupled with a USB bus using a reference voltage of 1.85V, the resulting signal 40 produced by the bi-directional booster circuit 20 are shown in FIG. 4. Below 1.6V, the result indicates the natural response of the booster circuit and above 1.6V indicates improved slew rate. If the buffer circuit had not been coupled to the USB bus, there would have been no transitional boost to the USB signal and the delay time of the signal would have been longer.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of transmitting signal on a bi-directional universal serial bus booster circuit comprising:
   connecting an input terminal to a universal serial bus;
   coupling a first inverting buffer in series with said input terminal;
   coupling a second inverting buffer directly in series with said first inverting buffer;
   forming a non-inverting buffer with said first inverting buffer and said second inverting buffer;
   coupling a resistor-capacitor ("RC") passive filter in series with said second buffer;
   connecting an output terminal to said RC passive filter wherein said output terminal is configured to connect with said universal serial bus;
   coupling a first resistor directly in series with said input terminal and said first inverting buffer;
   coupling a second resistor directly in series with said second inverting buffer circuit and said RC pass filter;
   wherein said first resistor, said second resistor and said RC passive filter are arranged to create positive feedback with respect to the input terminal; and
   wherein said RC passive filter limits modification of signals on said universal serial bus to signals with high-speed edge rates without affecting slow speed signaling, full speed signaling and special bus events on said universal serial bus.

* * * * *